(12) United States Patent
Karpovsky et al.

(10) Patent No.: US 12,619,733 B2
(45) Date of Patent: May 5, 2026

(54) OPTIMIZING ACCURACY OF SECURITY ALERTS BASED ON DATA CLASSIFICATION

(71) Applicant: MICROSOFT TECHNOLOGY LICENSING, LLC, Redmond, WA (US)

(72) Inventors: Andrey Karpovsky, Kiryat Motzkin (IL); Sagi Lowenhardt, Hertzeliya (IL); Shimon Ezra, Petach Tikva (IL)

( * ) Notice: Subject to any disclaimer, the term of this patent is extended or adjusted under 35 U.S.C. 154(b) by 184 days.

(21) Appl. No.: 17/808,481

(22) Filed: Jun. 23, 2022

(65) Prior Publication Data

US 2023/0418948 A1     Dec. 28, 2023

(51) Int. Cl.
| | |
|---|---|
| *G06F 21/57* | (2013.01) |
| *G06F 21/62* | (2013.01) |
| *H04L 9/40* | (2022.01) |
| *G06N 20/00* | (2019.01) |

(52) U.S. Cl.
CPC ........ *G06F 21/577* (2013.01); *G06F 21/6245* (2013.01); *H04L 63/1425* (2013.01); *G06F 2221/033* (2013.01); *G06N 20/00* (2019.01)

(58) Field of Classification Search
CPC .... G06F 21/577; G06F 21/6245; G06F 21/56; G06F 21/554; H04L 63/1425; G06N 20/00
USPC ......................................................... 726/26
See application file for complete search history.

(56) References Cited

U.S. PATENT DOCUMENTS

| | | | |
|---|---|---|---|
| 10,496,842 B1 * | 12/2019 | Ren ...................... | H04L 63/1433 |
| 2020/0159947 A1 * | 5/2020 | Shenefiel ............ | H04L 63/1425 |
| 2020/0274894 A1 | 8/2020 | Argoeti et al. | |
| 2023/0153427 A1 * | 5/2023 | Croteau ............... | G06F 21/554 |
| | | | 726/22 |

OTHER PUBLICATIONS

"International Search Report and Written Opinion Issued in PCT Application No. PCT/US23/022633", Mailed Date: Sep. 14, 2023, 11 Pages. (Ms# 411600-WO-PCT).
Xiao, et al., "Secure Mobile Crowdsensing Based On Deep Learning", In Journal of China Communications, vol. 15, Issue 10, Oct. 2018, pp. 1-11.

* cited by examiner

*Primary Examiner* — Tan Doan
(74) *Attorney, Agent, or Firm* — Workman Nydegger

(57) ABSTRACT
A computing system and method for training one or more machine-learning models to perform anomaly detection. A training dataset is accessed. An overall sensitivity score is determined that indicates an amount of sensitive data in the training dataset. Machine-learning models are trained based on the training dataset and the overall sensitivity score. The machine-learning models use the overall sensitivity score to determine a threshold. The threshold is relatively low for datasets having a large amount of sensitive data and is relatively high for dataset having a small among of sensitive data. When executed, the machine-learning models determine if a probability score of features extracted from a received dataset are above the determined threshold when a second overall sensitivity score of the received dataset is substantially similar to the overall sensitivity score. When the probability score is above the determined threshold, the machine-learning models cause an alert to be generated.

17 Claims, 11 Drawing Sheets

100

100

500

Access A Training Dataset 510

Determine An Overall Sensitivity Score For The Training Dataset 520

Train Machine-learning Model(s) To Perform Anomaly Detection Based On The Training Dataset And The Overall Sensitivity Score And To Determine A Threshold 530

Deploy The Trained Machine-learning Model(s) 540

600

Execute Trained Machine-learning Model(s) 610

Determine An Overall Sensitivity Score For The Training Dataset 611

Use The Overall Sensitivity Score To Determine A Threshold 612

Receive A Dataset 620

Determine If A Probability Score Of Extracted Features Is Above The Threshold 630

Generate An Alert When Probability Score Of Extracted Features Is Above The Threshold 640

Computing System 700

Network 710

Communication Channels 708

UI 712

Output 712A

Input 712B

Processor(s) 702

Memory 704

706

Volatile

Non-Volatile

OPTIMIZING ACCURACY OF SECURITY ALERTS BASED ON DATA CLASSIFICATION

BACKGROUND

In computing networks, Intrusion Detection Systems (IDS) for cloud services are important and ubiquitous, sometimes even required by compliance policies. The common output of an IDS is security alerts or signals that are generated whenever a potential security breach is detected. If the security alerts or signals correctly identify the potential security breach, this is known as a true positive. However, if the security alerts or signals correctly identify the potential security breach, this is known as a false positive.

For a user of the IDS to have confidence in the results, the IDS should ensure that no potential security breaches are not identified. In other words, the output should ensure that as many true positives as possible are generated. On the other hand, if the IDS generates too many false positives, even if generating a large number of true positives, the usefulness of the output will be lessened as it will be full of useless "noise".

Balancing between generating as many true positives as possible while avoiding generating false positives is a problem inherent to an IDS that is not easily solved. This is especially true when the IDS is providing security alerts on different types of data. For example, for more sensitive data such as data that contains personal, financial, or medical information, it is especially important that as many true positives be generated as missing even one potential security breach can lead to serious consequences. However, for less important information such machine logs or telemetry data, not generating as many true positives as possible may result in little harm. Given that the IDS only has a given amount of computing resources, it is important to find the right balance between generating true positives and false positives that allow a user to have confidence in the output.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments disclosed herein solve the problems discussed above. For example, the embodiments disclosed herein determine an overall sensitivity score for datasets that are to be subjected to anomaly detection by an Intrusion Detection System (IDS). The overall sensitivity score indicates the amount of sensitive data included in the datasets. For datasets with a large amount of sensitive data, the overall sensitivity score will be relatively high while the overall sensitivity score for datasets with a small amount of sensitive data will be relatively low. The overall sensitivity score is then used to train one or more machine-learning models. The one or more machine-learning models use the overall sensitivity score to determine a threshold value that is used in anomaly detection. For datasets with a relatively high overall sensitivity score, the threshold value will typically be determined to be low so that most, if not all, true positive results are detected, thus allowing the user to respond to any malicious anomalies. For datasets with a relatively low overall sensitivity score, the threshold value will typically be determined to be high so that only a few alerts are passed to the user. In this way, the computing resources of the IDS are focused on detecting anomalies for sensitive data that needs more protection and the users computing resources are not wasted on investigating a large number of alerts triggered by anomalies for the non-sensitive data that does not need much protection, thus saving these resources to also focus on responding to the anomalies for the sensitive data.

One embodiment is related to a computing system and method for training one or more machine-learning models to perform anomaly detection. A training dataset is accessed. An overall sensitivity score is determined that indicates an amount of sensitive data in the training dataset. Machine-learning models are trained based on the training dataset and the overall sensitivity score. The machine-learning models use the overall sensitivity score to determine a threshold. The threshold is relatively low for datasets having a large amount of sensitive data and is relatively high for dataset having a small among of sensitive data. When executed, the machine-learning models determine if a probability score of features extracted from a received dataset are above the determined threshold when a second overall sensitivity score of the received dataset is substantially similar to the overall sensitivity score. When the probability score is above the determined threshold, the machine-learning models cause an alert to be generated.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

The embodiments disclosed herein solve the problems discussed above. For example, the embodiments disclosed herein determine an overall sensitivity score for datasets that are to be subjected to anomaly detection by an Intrusion Detection System (IDS). The overall sensitivity score indicates the amount of sensitive data included in the datasets. For datasets with a large amount of sensitive data, the overall sensitivity score will be relatively high while the overall sensitivity score for datasets with a small amount of sensitive data will be relatively low. The overall sensitivity score is then used to train one or more machine-learning models. The one or more machine-learning models use the overall sensitivity score to determine a threshold value that is used in anomaly detection. For datasets with a relatively high overall sensitivity score, the threshold value will typically be determined to be low so that most, if not all, true positive results are detected, thus allowing the user to respond to any malicious anomalies. For datasets with a relatively low overall sensitivity score, the threshold value will typically be determined to be high so that only a few alerts are passed to the user. In this way, the computing resources of the IDS are focused on detecting anomalies for sensitive data that needs more protection and the users computing resources are not wasted on investigating a large number of alerts triggered by anomalies for the non-sensitive data that does not need much protection, thus saving these resources to also focus on responding to the anomalies for the sensitive data.

Figure 1A:
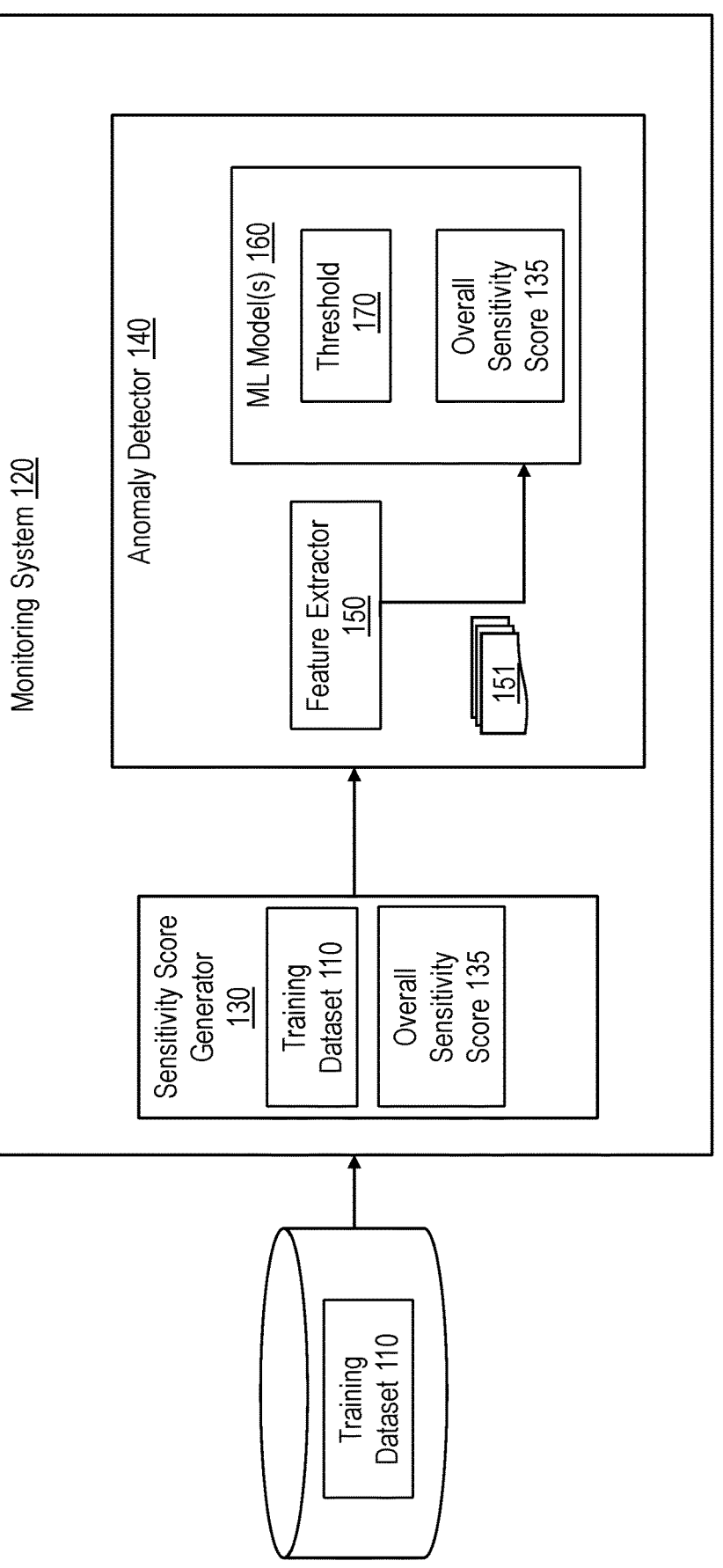
FIGS. 1A-1E illustrate an example computing system for using a training dataset to train one or more machine-learning models.

FIG. 1A illustrates an example computing system 100 that implements the principles described herein. As illustrated in FIG. 1A, the computing system 100 includes a monitoring system 120 that is configured to determine any anomalies in a training dataset 110. The monitoring system 120 is an example of an Intrusion Detection System (IDS). Based on the monitoring of the training dataset 110, the monitoring system 120 is able to determine if any of the data in the training dataset is anomalous based on features that are extracted from the data and based on an overall sensitivity score 135 that is indicative of how much sensitive data is included in the training dataset. As will be explained in more detail to follow, the monitoring system 120 trains one or more machine-learning models 160 to set a threshold or cut-off value 170 based on the overall sensitivity score 135 for each of the extracted features. The threshold 170 is then used when determining if received data is anomalous or not.

As illustrated in FIG. 1A, the monitoring system 120 includes a sensitivity score generator 130. Although illustrated as part of the monitoring system 120, in some embodiments the sensitivity score generator 130 may be separate from the monitoring system 120. In operation, the sensitivity score generator 130 accesses or receives the training dataset 110. The sensitivity score generator 130 is then configured to determine the overall sensitivity score 135 of the training dataset 110. In some embodiments, the sensitivity score generator 130 scans the training dataset 110 to determine if the data included in the dataset is sensitive data, non-sensitive data, or a combination of sensitive data and non-sensitive data and then uses this determination to generate the overall sensitivity score 135.

The overall sensitivity score 135 is a measure or indicator of how much sensitive data is included in the training dataset 110. As will be appreciated, sensitive data is data that is private or personal and is of a type that a user of the computing system 100 would typically like to keep secret as its disclosure could cause problems for the user. Examples of sensitive data include, but are not limited to, any personal identifying information that could lead a third party to determine the identity of the user, banking or other financial information, medical information, personal photographs, and/or company secret information. Of course, there may be other types of sensitive data and thus the embodiments disclosed herein are not limited to the types of sensitive data.

Non-sensitive data, on the other hand, is data that the user of computing system 100 is less concerned about. Examples of non-sensitive data include, but are not limited to, machine logs, telemetry data, and/or made up data that is used for various purposes such as testing a computing system. Of course, there may be other types of non-sensitive data and thus the embodiments disclosed herein are not limited to the types of sensitive data.

As mentioned before, the overall sensitivity score 135 is an indication of an amount of sensitive data is included in the training dataset 110. Thus, if the training dataset includes a high amount of sensitive data, then the overall sensitivity score 135 will be a relatively high value. On the other hand, if the training dataset 110 includes a small amount of sensitive data, then the overall sensitivity score 135 will be relatively low. If the training dataset 110 includes a mixture of both sensitive and non-sensitive data, then the overall sensitivity score 135 will be somewhere in between a relatively high and relatively low value. How the overall sensitivity score 135 is determined will be further explained in relation to FIGS. 1B-1E.

Figure 1B:
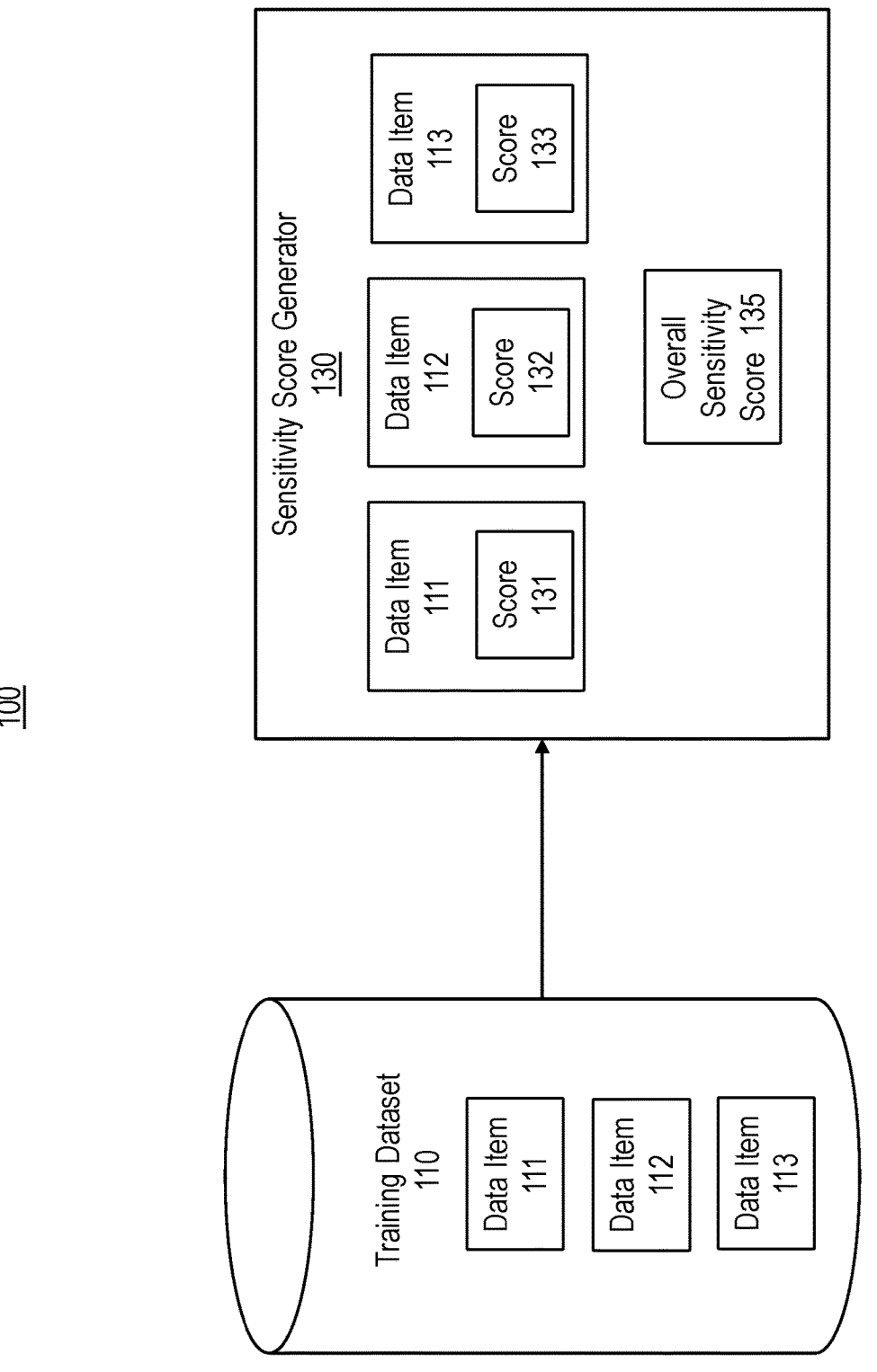

FIG. 1B illustrates an embodiment of the training dataset 110 and the sensitivity score generator 130. As illustrated, the training dataset 110 includes three data items 111, 112, and 113. Although not illustrated, the training dataset 110 can include any number of additional data items. In operation, the training dataset 110 and its various data items are provided to the sensitivity score generator 130.

The sensitivity score generator 130 then determines a sensitivity score 131, 132, and 133 for each of the data items 111, 112, and 113 respectively. In some embodiments, the sensitivity score generator 130 may scan each of the data items to determine if it is sensitive or not and if it is sensitive, how sensitive it is. The sensitivity score generator 130 then determines the sensitivity scores 131, 132, and 133.

For example, the sensitivity score generator 130 may scan metadata associated with the data item that specifies its content. In other embodiments, the user may provide an indicator that specifies what the user considers to be sensitive or non-sensitive data. In other embodiments, other methods may be used to determine whether a data item is sensitive or non-sensitive.

Based on the metadata or the indicator (or some other method), a sensitivity score can be determined. For instance, suppose the metadata of the data item 111 indicated that the data item was a financial record, the metadata of the data item 112 indicated that the data item was also a financial record, and the metadata of the data item 112 indicated that the data item was a personal photograph. In such case, the sensitivity score generator 130 would assign a sensitivity score 131 and 132 to the data items 111 and 112 that was high since a financial record in quite sensitive. Since a personal photograph is also sensitive, but perhaps less sensitive than a financial record, the sensitivity score generator 130 would assign a sensitivity score 133 to the data item 113 that was not as high as the sensitivity scores 131 and 132, but would still be higher than a sensitivity score for a non-sensitive data item.

The individual sensitivity scores 131, 132, and 133 are then used to determine the overall sensitivity score 135. In some embodiments, the overall sensitivity score 135 may be an average of the sensitivity scores 131, 132, and 133. In other embodiments, the overall sensitivity score 135 is determined based on a total number or volume of the data items that are determined to be sensitive in relation to the total number of data items in the training dataset. Thus, if the data items 111 and 113 are determined to be sensitive and the data item 112 is determined to be non-sensitive, then the overall sensitivity score 135 would be determined based on the ratio of two sensitive data items to three overall data items.

Figure 1C:
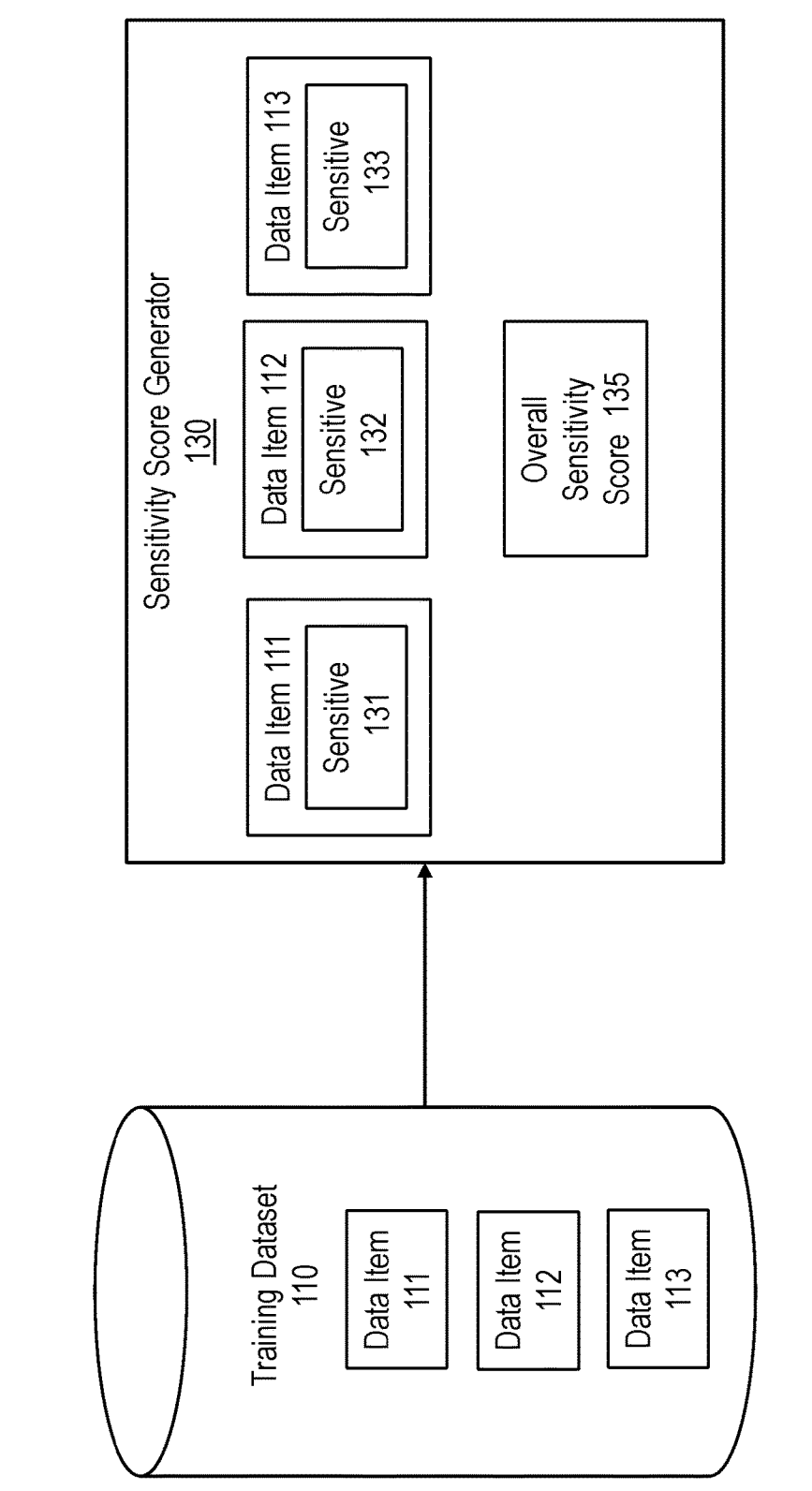

FIG. 1C illustrates an embodiment of the training dataset 110 and the sensitivity score generator 130. As illustrated, the training dataset 110 includes the three data items 111, 112, and 113. Although not illustrated, the training dataset 110 can include any number of additional data items. In operation, the training dataset 110 and its various data items are provided to the sensitivity score generator 130. In the embodiment of FIG. 1C, the data items 111, 112, and 113 have been determined to be sensitive data such as personal information, financial records, or medical records. Accordingly, they have all been given individual sensitivity scores 131, 132, and 133 that are listed as being sensitive. Accordingly, the overall sensitivity score 135 will be relatively high in this embodiment, as can be seen in Figure xxx.

Figure 1D:
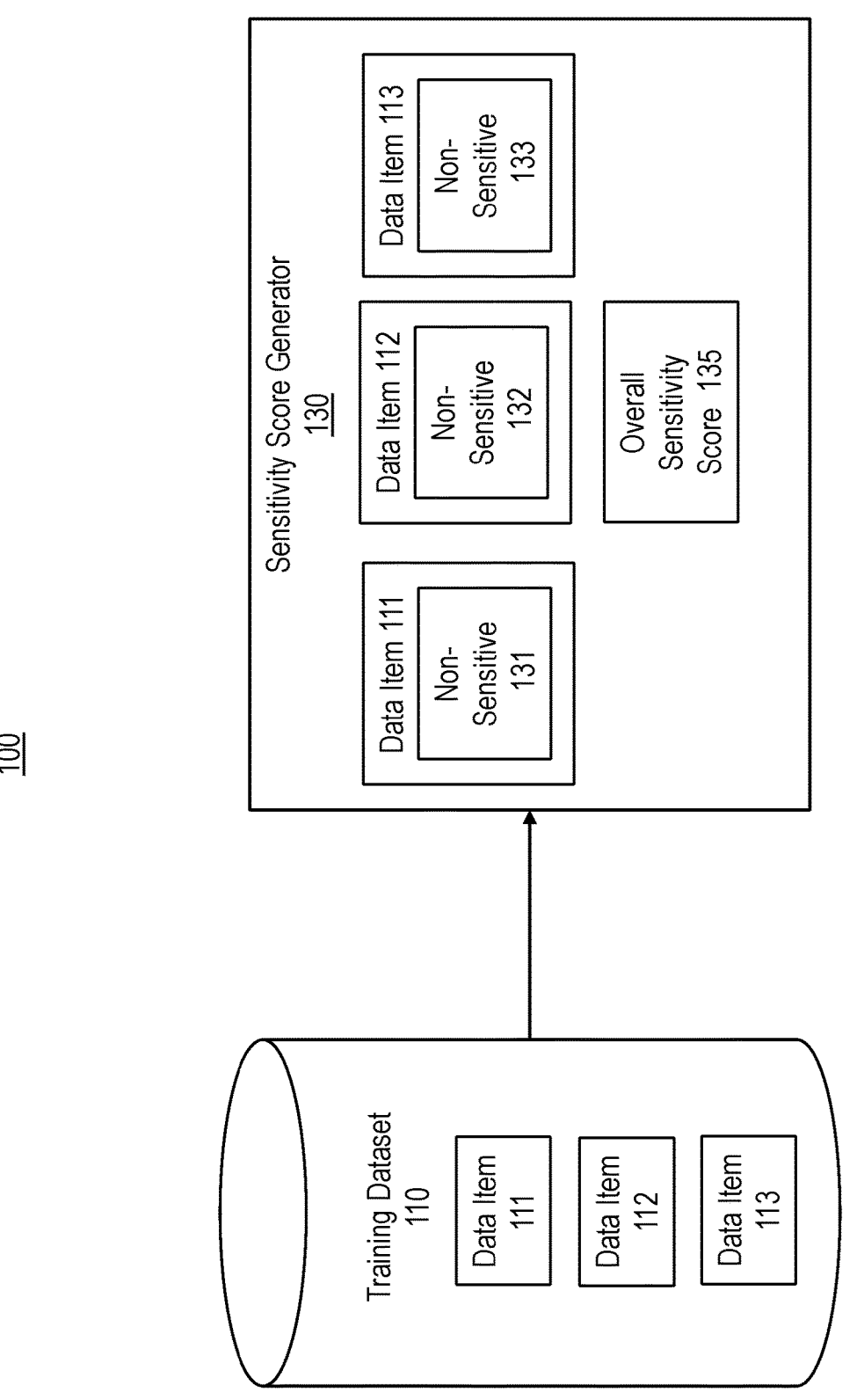

FIG. 1D illustrates an embodiment of the training dataset 110 and the sensitivity score generator 130. As illustrated, the training dataset 110 includes the three data items 111, 112, and 113. Although not illustrated, the training dataset 110 can include any number of additional data items. In operation, the training dataset 110 and its various data items are provided to the sensitivity score generator 130. In the embodiment of FIG. 1D, the data items 111, 112, and 113 have been determined to be non-sensitive data such as machine logs or telemetry data. Accordingly, they have all been given individual sensitivity scores 131, 132, and 133 that are listed as being non-sensitive. Accordingly, the overall sensitivity score 135 will be relatively low in this embodiment, as can be seen in Figure xxx.

Figure 1E:
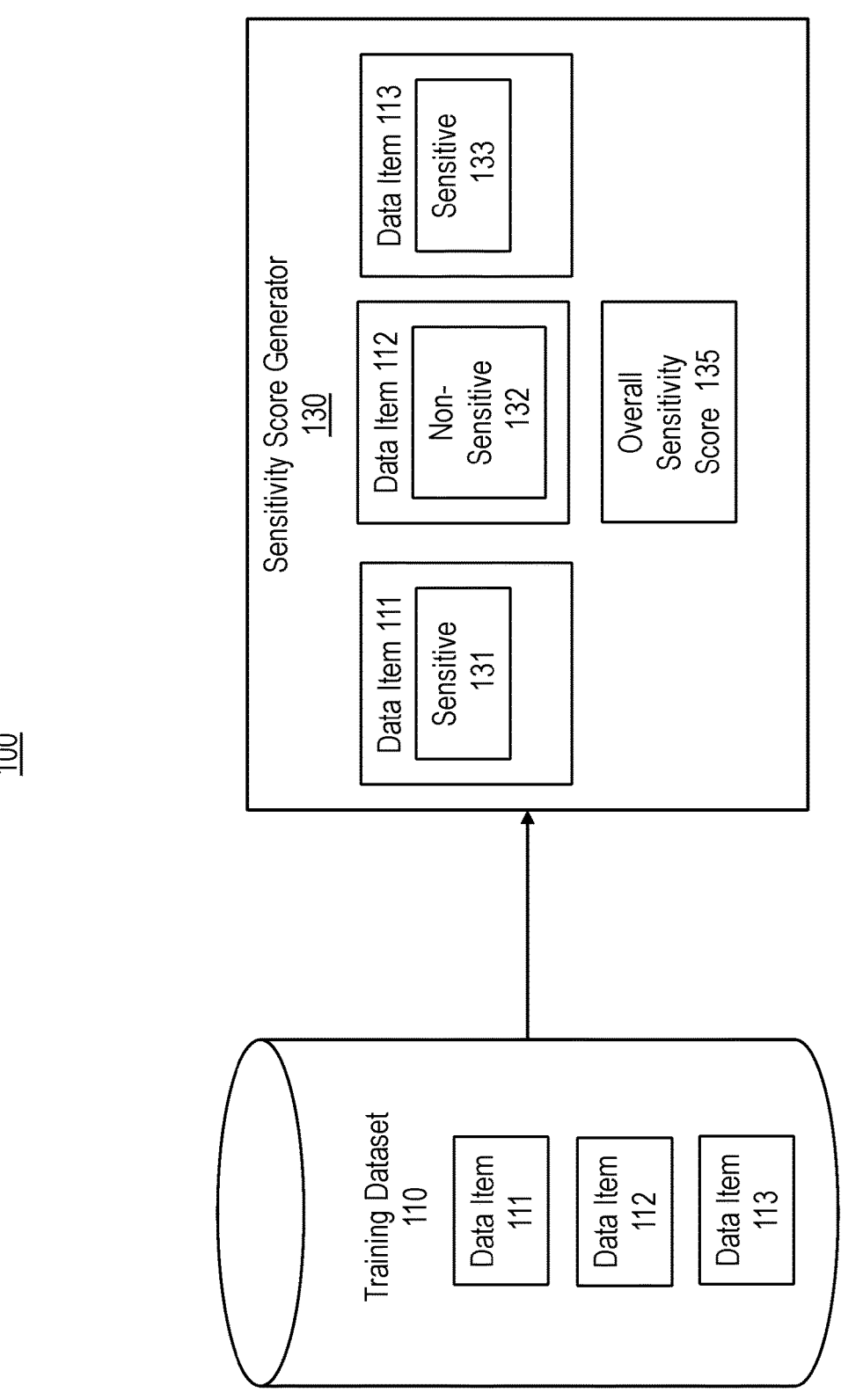

FIG. 1D illustrates an embodiment of the training dataset 110 and the sensitivity score generator 130. As illustrated, the training dataset 110 includes the three data items 111, 112, and 113. Although not illustrated, the training dataset 110 can include any number of additional data items. In operation, the training dataset 110 and its various data items are provided to the sensitivity score generator 130. In the embodiment of FIG. 1E, the data items 111 and 113 have been determined to be sensitive data. Accordingly, the individual sensitivity scores 131 and 133 are listed as sensitive. However, in this embodiment, the data item 112 has been determined to be non-sensitive data. Accordingly, the individual sensitivity score 132 is listed as being non-sensitive.

The overall sensitivity score 135 is determined based on the sensitivity scores 131, 132, and 133. As mentioned above, the overall sensitivity score 135 may be determined based on a total number of the data items that are determined to be sensitive in relation to the total number of data items in the training dataset. Since the data items 111-113 include both sensitive and non-sensitive data, the overall sensitivity score 135 will be somewhere between the overall sensitivity scores of the embodiments of FIGS. 1C and 1D as shown in Figure xxx.

Returning to FIG. 1A, the monitoring system 120 includes an anomaly detector 140. In operation, the anomaly detector

140 receives both the training dataset 110 and the overall sensitivity score 135 from the sensitivity score generator 130. In those embodiments where the sensitivity score generator 130 is separate from the monitoring system 120, the training dataset 110 may be received directly by the anomaly detector 140 while the overall sensitivity score 135 would still be received from the sensitivity score generator 130.

The anomaly detector 140 includes a feature extractor 150. In operation, the feature extractor 150 extracts various features 151 related to the training dataset 110. The extracted features 151 describe behavioral patterns of typical actions or operations taken in regard to the training dataset 110. For example, the extracted features 151 may include, but are not limited to, an IP address of a computing system attempting to extract data from the training dataset, a location of the request for data extraction, a time of the request for data extraction, applications attempting to access the training dataset, a device name or identification, an account name, and/or an organization name attempting to access the training dataset. It will be appreciated that there can be any number of additional features and thus the embodiments disclosed herein are not limited to any number or type of feature.

The anomaly detector 140 includes one or more machine-learning models 160. In operation, the one or more machine-learning models 160 are trained on at least a subset of the features 151 of the training dataset 110 provided by the feature extractor and the overall sensitivity score 135 of the training dataset 110. In some embodiments, the one or more machine-learning models 160 may be one of a unsupervised model, a semi-supervised model, or a supervised model. Many different machine-learning algorithms may be used to train the one or more machine-learning models 160, including (but not limited to) clustering-based anomaly detection models, convolutional neural networks, multilayer neural networks, recursive neural networks, deep neural networks, logistic regression, isolation forest, k-nearest neighbors, support vector machines (SVM), density-based algorithm, elliptic envelope, local outlier factor, Z-score, Boxplot, statistical techniques, time series techniques, or any other reasonable machine-learning algorithms.

During the training process, the one or more machine-learning models 160 are trained to determine a threshold or cutoff value 170. As will be explained in more detail to follow, the threshold 170 is used by the one or more machine-learning models 160 to determine if the actions or operations taken on the training dataset 110 specified by the features 151 are anomalous or not. That is, when the one or more machine-learning models 160 determine that a probability score associated with the features is above the threshold 170, then it is determined that an anomaly has occurred.

As mentioned, the overall sensitivity score 135 of the dataset is also used by the one or more machine-learning models 160 when determining the threshold 170. As will be explained in more detail to follow, if the training dataset has a relatively high overall sensitivity score 135, then a lower threshold 170 is desirable as this helps to ensure that more potential anomalies are likely to be detected. Conversely, if the training dataset has a relatively low overall sensitivity score 135, then a higher threshold 170 is desirable as this helps to ensure that only truly anomalous results are detected.

Figure 2:
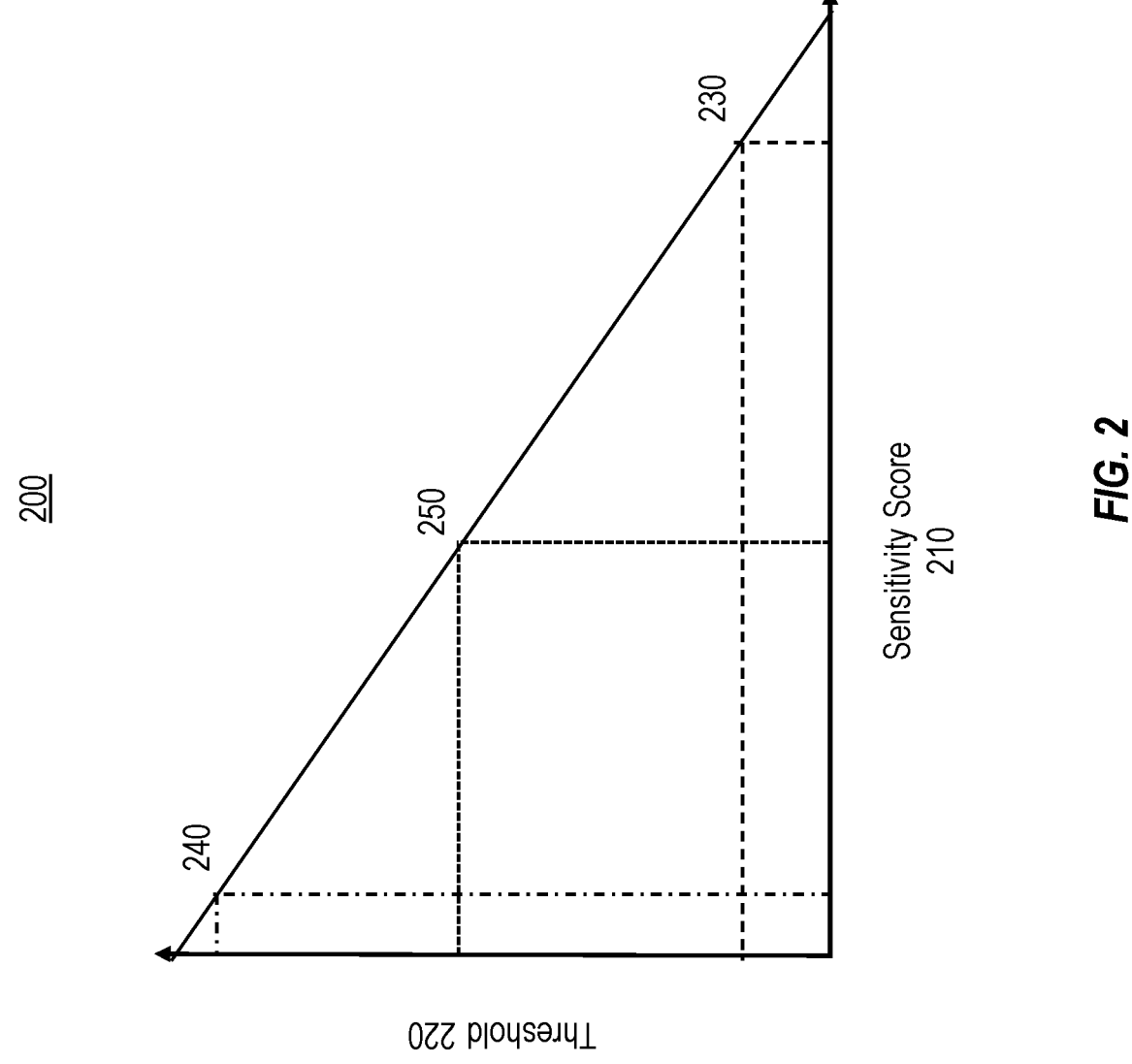
FIG. 2 illustrates a graph of a sensitivity score versus a threshold.

FIG. 2 illustrates a graph 200 having a sensitivity score 210 as the horizontal axis and a threshold 220 as the vertical graph. As illustrated in the figure, as the overall sensitivity score increases, thus indicating that the training dataset 110 includes a high amount of sensitive data, the threshold determined by the one or more machine-learning models 160 becomes a lower value. On the other hand, for a low overall sensitivity score, the threshold determined by the one or more machine-learning models 160 becomes a lower value.

For example, in the embodiment of FIG. 1C previously discussed, the data items 111-113 were determined to be sensitive data and were given high individual sensitivity scores. Accordingly, the overall sensitivity score 135 was determined to be relatively high. In FIG. 2, 230 represents the embodiment of FIG. 1C. As shown at 230, the relatively high overall sensitivity score leads to a relatively low threshold.

In the embodiment of FIG. 1D previously discussed, the data items 111-113 were determined to be non-sensitive data and were given low individual sensitivity scores. Accordingly, the overall sensitivity score 135 was determined to be relatively low. In FIG. 2, 240 represents the embodiment of FIG. 1D. As shown at 240, the relatively low overall sensitivity score leads to a relatively high threshold.

In the embodiment of FIG. 1E previously discussed, the data items 111 and 113 were determined to be sensitive data and were given high individual sensitivity scores. The data item 112 was determined to non-sensitive and was given a low individual sensitivity score. Accordingly, the overall sensitivity score 135 was determined to be a value that would be in between the overall sensitivity scores of the embodiments of FIGS. 1C and 1D. In FIG. 2, 250 represents the embodiment of FIG. 1E. As shown at 250, the overall sensitivity score when having both sensitive and non-sensitive data leads to a threshold that is in between the thresholds shown at 230 and 240.

It will be appreciated that the graph of FIG. 2 is for explanation purposes only. Thus, the graph shows that that the one or more machine-learning models 160 determine the threshold 170 on a sliding scale where the threshold become lower as the amount of sensitive data in the training dataset 110 increases. As the one or more machine-learning models 160 continue to learn, the models are able to adjust the threshold value as needed.

Figure 3:
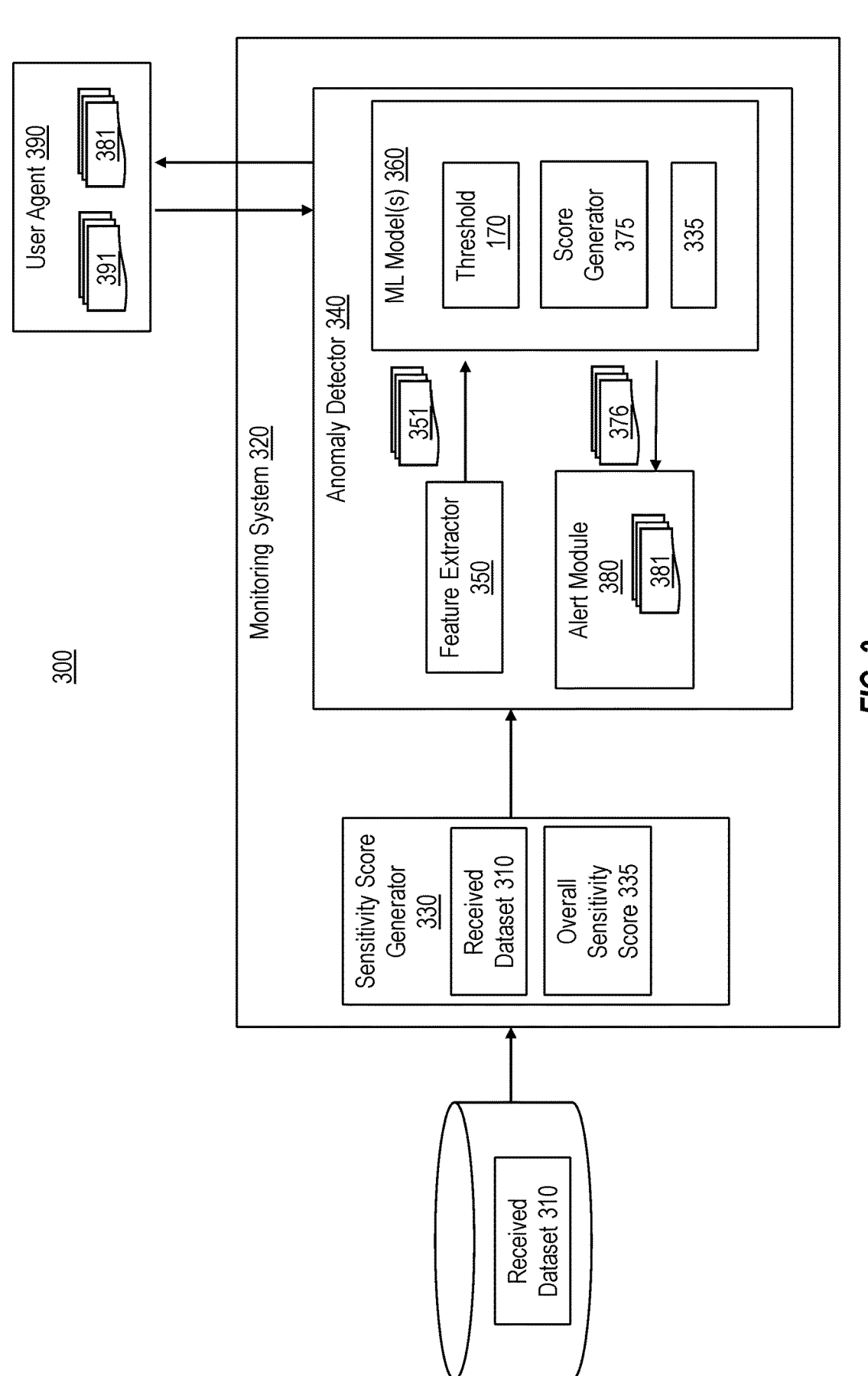
FIG. 3 illustrates an example computing system using a trained one or more machine-learning models to perform anomaly detection.

The trained one or more machine-learning models 160 can then be used for anomaly detection. FIG. 3 illustrates a computing system 300 that may correspond to the computing system 100 that was used to train the one or more machine-learning models 160. Thus, in some embodiments the one or more machine-learning models 160 are trained and used for anomaly detection by the same computing system while in other embodiments the computing system 100 used to train the one or more machine-learning models 160 may be different from the computing system 300 that uses the trained machine-learning model for anomaly detection.

As illustrated, a received dataset 310 is received by a monitoring system 320 that may correspond to the monitoring system 120. The received dataset 310 is received from one or more client devices that communicate with the computing system 300. Alternatively, the received dataset 310 is received from a storage database where the dataset has been previously stored.

The received dataset 310 is received by a sensitivity score generator 330 that may correspond to the sensitivity score generator 330. The sensitivity score generator 330 is configured to generate an overall sensitivity score 335 for the received dataset 310. The overall sensitivity score 335 can be determined in the manner previously described in relation to FIGS. 1A-1E.

The received dataset 310 is provided to an anomaly detector 340 that may correspond to the anomaly detector 140. The anomaly detector 340 includes a feature extractor 350 that may correspond to the feature extractor 150. The feature extractor 350 is configured to extract various features 351 related to the received dataset 310. As with the extracted features 151, the extracted features 351 describe behavioral patterns of typical actions or operations taken in regard to the received dataset 310. For example, the extracted features 351 may include, but are not limited to, an IP address of a computing system attempting to extract data from the received dataset 310, a location of the request for data extraction, a time of the request for data extraction, applications attempting to access the training dataset, a device name or identification, an account name, and/or an organization name attempting to access the received dataset 310. It will be appreciated that there can be any number of additional features and thus the embodiments disclosed herein are not limited to any number or type of feature.

The extracted features 351 are provided to one or more machine-learning models 360 that may correspond to the machine-learning models 160 that were trained to determine that threshold 170 based on the overall sensitivity score 135. The one or more machine-learning models 360 also receive the overall sensitivity score 335.

The one or more machine-learning models 360 are configured to compare the overall sensitivity score 335 of the received dataset 310 with that of overall sensitivity score 135 used to train the model. When the overall sensitivity score 335 is substantially similar to the overall sensitivity score 135, the one or more machine-learning models 360 is able to determine a threshold 170 to use in the anomaly detection. For example, if the overall sensitivity score 335 is substantially similar to the overall sensitivity score 135 of FIG. 1C, then the threshold 170 would be similar to the threshold shown at 230 in FIG. 2. Likewise, if the overall sensitivity score 335 is substantially similar to the overall sensitivity score 135 of FIG. 1D, then the threshold 170 would be similar to the threshold shown at 240 in FIG. 2. In addition, if the overall sensitivity score 335 is substantially similar to the overall sensitivity score 135 of FIG. 1E, then the threshold 170 would be similar to the threshold shown at 230 in FIG. 2.

As shown in FIG. 3, the one or more machine-learning models 360 are configured to instantiate or comprise a score generator 375. The score generator 375 receives the extracted features 351 and to generate a probability score 376 for each of the features, indicating a probability that a feature is anomalous.

The probability score 376 is processed by an alert module 380 of the anomaly detector 340. When the probability score 376 is above the threshold 170, the alert module 380 is configured to generate an alert 381 that indicates that a potential anomaly has been detected.

A specific example will now be explained. Suppose that a first received dataset 310 contains important company secret information of user and was thus given a high overall sensitivity score 335 and that a second received dataset 310 contains machine logs of the same user and was thus given a low overall sensitivity score 335. Further suppose that the user is located in California and that an extracted feature from both the first and the second received datasets indicated that an IP address in Israel tried to access the data in both datasets. Since the overall sensitivity score 335 of the first received dataset is high, the threshold 170 would be low to ensure that most if not all serious anomalies were detected. Thus, it is highly likely that since the user is located in California, the probability score 376 of the extracted feature would be above the threshold 170 and would trigger an alert 381. That is, it is highly likely that an attempt to access the first dataset from Israel would be an anomaly, potentially a malicious anomaly.

However, since the overall sensitivity score 335 of the second received dataset is low, the corresponding threshold would be high so as to only detect serious anomalies. Thus, even though the user is located in California, the probability score 376 of the extracted feature would be below the threshold 170 and no alert would be triggered. That is, because the user is not worried if the non-sensitive machine logs are accessed by unauthorized parties, the threshold is set to not detect most anomalies regarding the machine logs.

The alert 381 is then provided to a user agent 390, such as a web browser or other computing system, of the user of the monitoring system 320 to thereby allow the user to investigate and to take appropriate steps if the detected anomaly is malicious. In some embodiments, the alert 381 is sent as a suggestion to the user agent 390 and no action is taken in relation to an anomaly by the monitoring system unless directed by the user.

In some embodiments, the user agent 390 may determine that too many alerts 381 are being received for a given received dataset 310. Thus, the user agent 390 may determine that the threshold 170 has been set too low, notwithstanding the overall sensitivity score assigned to the dataset. In other words, even though the received dataset has been assigned an appropriate overall sensitivity score given the amount of included sensitive data, the user does not want to receive as many alerts as are being generated. In such case, the user agent 390 can provide user feedback 391 to anomaly detector 340. In response to the user feedback 391, the anomaly detector 340 can adjust the threshold 170 so that the one or more machine-learning models 360 detect less anomalies that trigger the alert. In some embodiments, adjusting the threshold comprises adjusting the overall sensitivity score 335 so that the one or more machine-learning models 360 automatically adjust the threshold 170.

In some embodiments, the user feedback 391 may be in the form of user interaction with the received dataset. For example, in one embodiment, a long period of time may pass between sending an alert 381 to the user agent 390 and the return of the user feedback 391. Since it often takes the user a long period of time to deal with an anomaly that is of an actual malicious nature such as an unauthorized party trying to access a sensitive dataset, the one or more machine-learning models 360 may infer from the long period of time that the received dataset is extremely sensitive. In such instances, the one or more machine-learning models 360 can adjust the threshold to be more in accordance with a threshold for extremely sensitive data.

Figure 4:
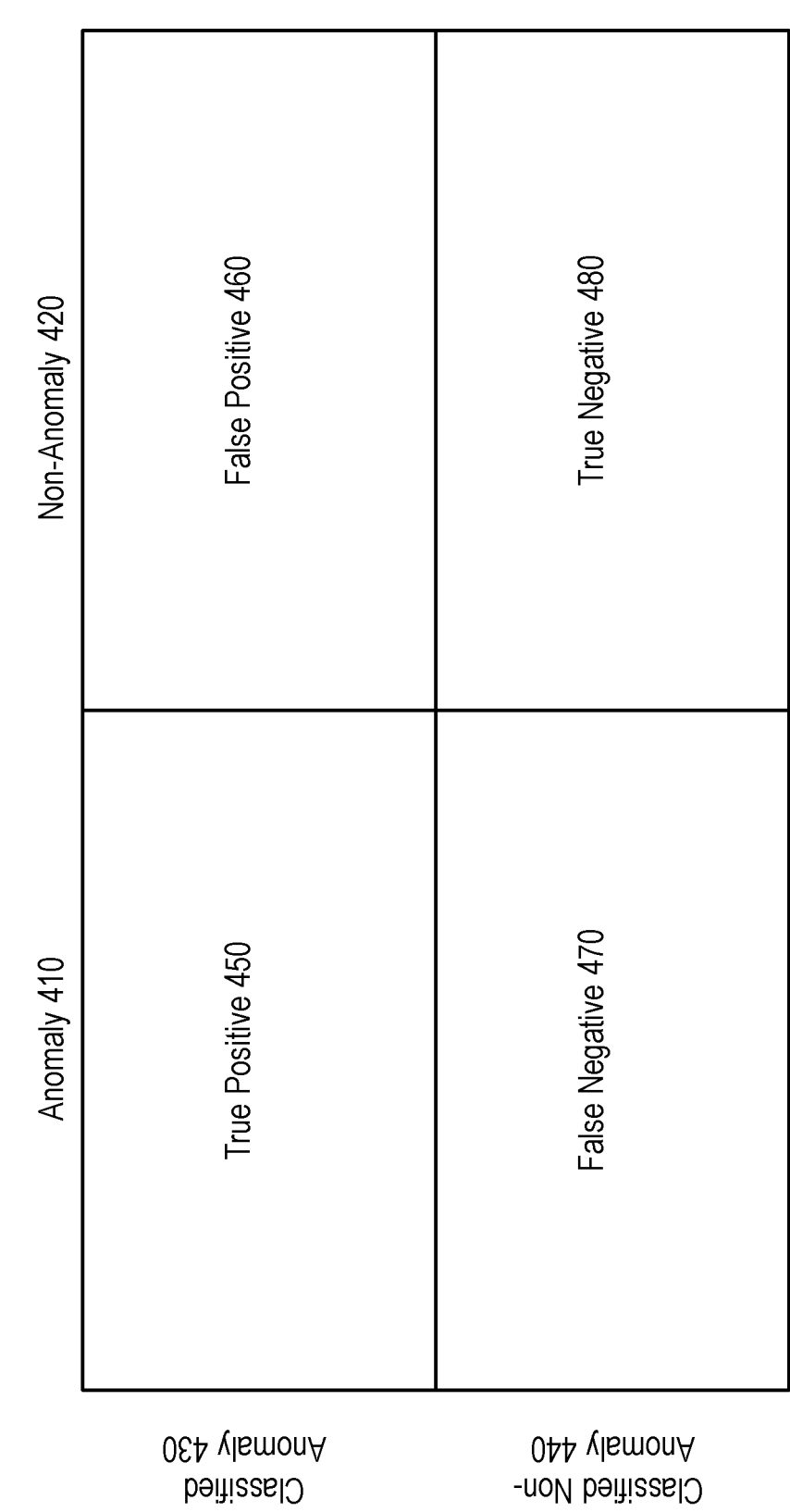
FIG. 4 illustrates an example confusion matrix.

FIG. 4 illustrates an embodiment of a confusion matrix 400. As illustrated in FIG. 4, the confusion matrix 400 includes two columns and two rows. The first column represents data from a monitored dataset that are actually an anomaly 410. The second column represents data from the monitored dataset that are actually a non-anomaly 420. The first row represents the data from the monitored dataset that are classified by an IDS as an anomaly 430. The second row represents the data from the monitored dataset that are classified by the IDS to be a non-anomaly 440. As such, the top-left block represents true positive results 450, which include classifications of data that are correctly predicted to be an anomaly. The top-right block represents false-positive results 460, which include classifications of data that are incorrectly classified as being non-anomalous when in fact such data is anomalous. The bottom-left block represents false-negative results 470, which include classifications of data that are incorrectly classified as non-anomalous, and that are actually anomalous. The bottom-right block represents true negative results 480, which include classifications of data that are correctly classified as non-anomalous.

Notably, when the threshold 170 changes, the results including the true positive results 450, false positive results 450, false negative results 470, and true negative results 480 will change. Thus, for those sensitive datasets, a relatively low threshold 170 is chosen as this will ensure that most true positive results 450 are detected. However, this will likely also mean that a large number of false positive results 460 will be detected as well. Given the importance of detecting as many true positive results as possible for sensitive data to ensure that the user will have the chance to address any malicious anomalies, the tradeoff between detecting as many true positive results as possible at the cost of detecting a large number of false positive results is acceptable for sensitive data.

Likewise, for those non-sensitive datasets, a relatively high threshold 170 is chosen as this will ensure that only a few true positive results 450 are detected while most false positive results are not detected. Since the data in the dataset is likely not important to protect as it is non-sensitive, the tradeoff between detecting only few true positive results at the cost of missing many true positive results but also missing most false positive results is acceptable for non-sensitive data.

In one embodiment, the determination of a threshold is related to an accuracy metric $F_\beta$. This is shown in Equation 1 below.

$$F_\beta = \frac{(1+\beta^2) \cdot \text{true positive}}{(1+\beta^2) \cdot \text{true positive} + \beta^2 \cdot \text{false negative} + \text{false positive}} \qquad \text{Equation 1}$$

In Equation 1, the beta parameter is related to the overall sensitivity score of a received dataset. In some embodiments, the beta parameter is chosen according to a relevant sensitivity score of the dataset. For example, for a dataset containing weighted proportion s of sensitive items (e.g., harmonic mean of contained items' individual sensitivity scores, giving more weight to highly sensitive ones) and having support n (e.g., size of the dataset), a logistic transformation can be used to calculate the normalized factor beta as shown in Equation 2 below.

$$\beta = \frac{1}{1 + e^{n \cdot (0.5 - s)}} \qquad \text{Equation 2}$$

Accordingly, the embodiments disclosed herein provide the technical benefit of determining the threshold for anomaly detection based on the sensitivity of the analyzed dataset. This saves on computing resources as anomaly detection is not performed with the same accuracy and rigor for non-sensitive data as it is for sensitive data. In other words, computing resources are saved for protecting the data that is most in need of protection. In addition, the frequency of alerts provided to a user is not the same for sensitive data and non-sensitive data, providing the technical benefit of freeing up the user agent resources to focus on determining if the alerts triggered for the sensitive data are malicious anomalies, and if so on correcting the anomalies.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
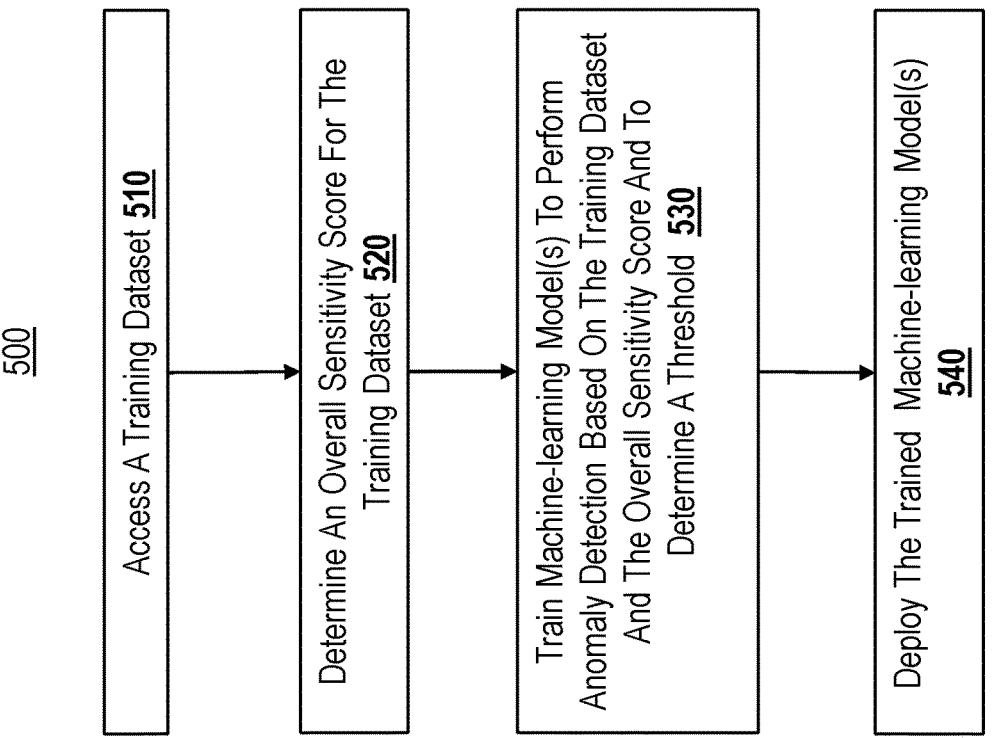
FIG. 5 illustrates a flowchart of an example method for a computing system to train one or more machine-learning models to perform anomaly detection.

FIG. 5 illustrates a flowchart of an example method 500 for a computing system to train one or more machine-learning models to perform anomaly detection. The method 500 will be described with respect to one or more of the figures previously discussed.

The method 500 includes accessing a training dataset (510). For example, as previously described the training dataset 110 is accessed.

The method 500 includes determining an overall sensitivity score for the training dataset. The overall sensitivity score is indicative of an amount of sensitive data included in the dataset (520). For example, as previously described an overall sensitivity score 135 is determined by the sensitivity score generator. The overall sensitivity score can be determined according to the embodiments discussed in relation to FIGS. 1B-1E.

The method 500 includes training one or more machine-learning models to perform anomaly detection based on the training dataset and the overall sensitivity score, the one or more machine-learning models using the sensitivity score to determine a threshold (530). For example, as previously described the one or more machine-learning models 160 and 360 are trained based on the training dataset 110 and the overall sensitivity score 135. The one or more machine-learning models 160 and 360 use the overall sensitivity score 135 to determine the threshold 170. As discussed in FIG. 2 at 230, 240, and 250, the determined threshold is configured such that a low threshold value is determined when the amount of sensitive data included in the training dataset is relatively high and a high threshold value is determined when the amount of sensitive data included in the training dataset is relatively low.

The method 500 includes deploying the trained one or more machine-learning models 160 and 360 (540). For example, as previously described, deploying the trained machine-learning models includes executing the one or more machine-learning models to determine if a probability score 376 of one or more features 151 and 351 extracted from the received dataset 310 are above the threshold 170 when a second overall sensitivity score 335 of the received dataset is substantially similar to the overall sensitivity score 135 of the training dataset. Deploying the trained machine-learning models also includes in response to determining that the probability score is above the determined threshold, causing an alert 381 to be generated, the alert indicating that an anomaly has been detected.

Figure 6:
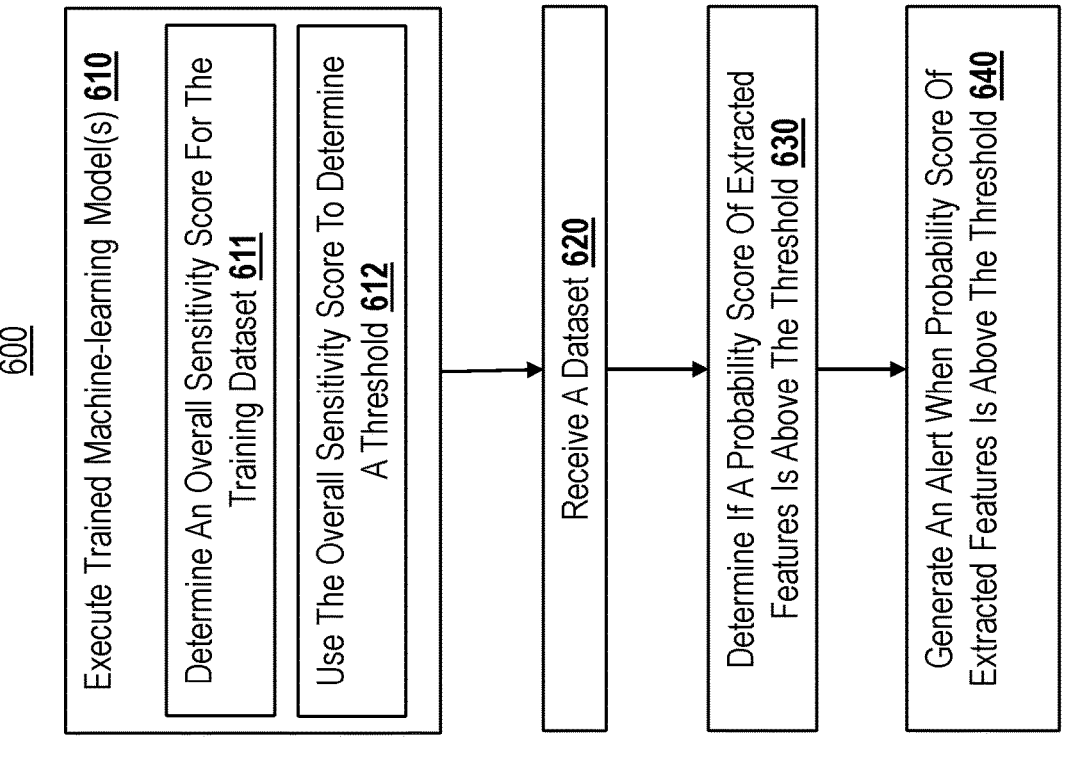
FIG. 6 illustrates a flowchart of an example method for a computing system to perform anomaly detection.

FIG. 6 illustrates a flowchart of an example method 600 for a computing system to perform anomaly detection. The method 600 will be described with respect to one or more of the figures previously discussed.

The method 600 includes executing one or more machine-learning models trained based on a training dataset (610). For example, the one or more machine-learning models 160 and 360 are trained based on the training dataset 110.

Training the one or more machine-learning models includes determining an overall sensitivity score for the training dataset that indicates an amount of sensitive data included in the dataset (611). For example, as previously described the overall sensitivity score 135 is determined for the training dataset 110.

Training the one or more machine-learning models includes using the overall sensitivity score to determine a threshold (612). For example, as previously described the threshold 170 is determined based on the overall sensitivity score 135. As discussed in FIG. 2 at 230, 240, and 250, the determined threshold is configured such that a low threshold value is determined when the amount of sensitive data included in the training dataset is relatively high and a high threshold value is determined when the amount of sensitive data included in the training dataset is relatively low.

The method 600 includes receiving a dataset at the computing system (620). For example, as previously described the received dataset 310 is received by the computing system.

The method 600 includes determining if a probability score of one or more features extracted from the received dataset are above the determined threshold when a second overall sensitivity score of the received dataset is substantially similar to the overall sensitivity score of the training dataset (630). For example, as previously described, the score generator 375 of the one more machine-learning models determines if a probability score 376 of one or more features 151 and 351 extracted from the received dataset 310 are above the determined threshold 170 when a second overall sensitivity score 335 of the received dataset 310 is substantially similar to the overall sensitivity score 135 of the training dataset.

The method 600 includes, in response to determining that the probability score is above the determined threshold, generating an alert, the alert indicating that an anomaly has been detected (640). For example, the alert module 380 generates an alert 381 when it is determined that probability score 376 is above the threshold 170.

Finally, because the principles described herein may be performed in the context of a computing system some introductory discussion of a computing system will be described with respect to FIG. 7. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
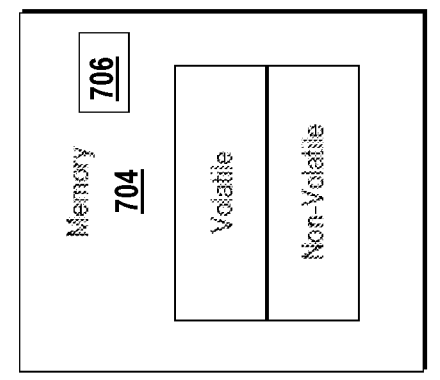
FIG. 7 illustrates an example computing system in which the embodiment described herein may be employed.

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 700 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 702 and memory 704, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a computing system to train one or more machine-learning models to perform anomaly detection, the method comprising:

accessing a group of training datasets, the training datasets including a plurality of data items;

determining overall sensitivity scores for the training datasets in the group, the overall sensitivity scores indicating an amount of sensitive data included in the training datasets and being determined based on individual sensitivity scores of the plurality of data items of the training datasets; and training one or more machine-learning models to perform anomaly detection based on the group of the training datasets and the overall sensitivity scores of the training datasets in the group, the one or more machine-learning models using the overall sensitivity scores to determine a respective threshold for a training dataset based on an inverse sliding scale relationship, wherein based on the inverse sliding scale relationship, the lower an overall sensitivity score is, the higher the respective threshold is, and the higher an overall sensitivity score is, the lower the respective threshold is, wherein:

when an overall sensitivity score of a received dataset, which is distinct from the group of the training datasets, is closer to an overall sensitivity score of one training dataset in the group than overall sensitivity scores of the other training datasets in the group based on the inverse sliding scale relationship, the one or more machine-learning models are configured to determine if a probability score of one or more features extracted from the received dataset is above a threshold of the one training dataset, and in response to determining that the probability score is above the threshold of the one training dataset, causing an alert to be generated, the alert indicating that an anomaly has been detected.

2. The method of claim 1, further comprising:

determining whether each of the plurality of data items is sensitive or is non-sensitive; and determining the overall sensitivity score based on the determination of whether each of the plurality of data items is sensitive or is non-sensitive.

3. The method of claim 2, wherein the overall sensitivity score is determined based on a total number of the data items that are determined to be sensitive in relation to the total number of data items in the training dataset.

4. The method of claim 2, wherein the dataset is scanned to determine whether each of the plurality of data items is sensitive or is non-sensitive.

5. The method of claim 1, further comprising:
receiving feedback from a user agent in response to the user agent receiving the generated alert; and
in response to the feedback, adjusting the threshold.

6. The method of claim 5, wherein adjusting the threshold comprises adjusting the overall sensitivity score.

7. The method of claim 1, further comprising:
receiving feedback from a user agent in response to user interaction with the dataset; and
in response to the feedback, adjusting the threshold.

8. A method for a computing system to perform anomaly detection, the method comprising:
executing one or more machine-learning models trained based on a group of training datasets, the training datasets including a plurality of data items, wherein training the one or more machine-learning models comprises:
determining overall sensitivity scores for the training datasets in the group, the overall sensitivity scores indicating an amount of sensitive data included in the datasets and being determined based on individual sensitivity scores of the plurality of data items of the training datasets; and
using the overall sensitivity scores to determine a respective threshold for a training dataset based on an inverse sliding scale relationship, wherein based on the inverse sliding scale relationship, the lower an overall sensitivity score is, the higher the respective threshold is, and the higher the overall sensitivity score is, the lower the respective threshold is;
receiving a dataset, which is distinct from the group of the training datasets, at the computing system;
when an overall sensitivity score of the received dataset is closer to an overall sensitivity score of one training dataset than overall sensitivity scores of the other training datasets in the group based on the inverse sliding scale relationship, determining if a probability score of one or more features extracted from the received dataset is above a threshold of the one training dataset; and
in response to determining that the probability score is above the threshold of the one training dataset, generating an alert, the alert indicating that an anomaly has been detected.

9. The method of claim 8, further comprising:
determining whether each of the plurality of data items is sensitive or is non-sensitive; and
determining the overall sensitivity score based on the determination of whether each of the plurality of data items is sensitive or is non-sensitive.

10. A computing system for training one or more machine-learning models to perform anomaly detection, comprising:
one or more processors; and
one or more computer-readable hardware storage devices having stored thereon computer-executable instructions that are structured such that, when executed by the one or more processors, the computer-executable instructions cause the computing system to perform at least:
access a group of training datasets, the training datasets including a plurality of data items;

determine overall sensitivity scores for the training datasets in the group, the overall sensitivity scores indicating an amount of sensitive data included in the training datasets and being determined based on individual sensitivity scores of the plurality of data items of the training datasets; and
train one or more machine-learning models to perform anomaly detection based on the group of the training datasets and the overall sensitivity scores of the training datasets in the group, the one or more machine-learning models using the overall sensitivity scores to determine a respective threshold for a training dataset based on an inverse sliding scale relationship, wherein based on the inverse sliding scale relationship, the lower an overall sensitivity score is, the higher the respective threshold is, and the higher the overall sensitivity score is, the lower the respective threshold is, wherein:
when an overall sensitivity score of a received dataset, which is distinct from the group of the training datasets, is closer to an overall sensitivity score of one training dataset in the group than overall sensitivity scores of the other training datasets in the group based on the inverse sliding scale relationship, the one or more machine-learning models are configured to determine if a probability score of one or more features extracted from the received dataset is above a threshold of the one training dataset, and
in response to determining that the probability score is above the threshold of the one training dataset, the one or more machine-learning models cause an alert to be generated, the alert indicating that an anomaly has been detected.

11. The computing system of claim 10, wherein the computing system is further configured to:
determine whether each of the plurality of data items is sensitive or is non-sensitive; and
determine the overall sensitivity score based on the determination of whether each of the plurality of data items is sensitive or is non-sensitive.

12. The computing system of claim 11, wherein the overall sensitivity score is determined based on a total number of the data items that are determined to be sensitive in relation to the total number of data items in the training dataset.

13. The computing system of claim 11, wherein the dataset is scanned to determine whether each of the plurality of data items is sensitive or is non-sensitive.

14. The computing system of claim 10, the computing system is further configured to:
receive feedback from a user agent in response to the user agent receiving the generated alert; and
in response to the feedback, adjust the threshold.

15. The computing system of claim 14, wherein adjusting the threshold comprises adjusting the overall sensitivity score.

16. The computing system of claim 10, wherein the computing system is further configured to:
receive feedback from a user agent in response to user interaction with the dataset; and
in response to the feedback, adjust the threshold.

17. The computing system of claim 10, wherein the one or more machine-learning models are one of a supervised model, a semi-supervised model, or an unsupervised model.

\* \* \* \* \*